Sept. 9, 1969 R. T. PETERS ET AL 3,466,156

MAGNETIC RECORD MEMBERS

Filed Dec. 1, 1966 2 Sheets-Sheet 1

INVENTORS
RICHARD T. PETERS
ELIOT STONE
JOSEPH J. BOURDON

BY

THEIR ATTORNEYS

Sept. 9, 1969 R. T. PETERS ET AL 3,466,156

MAGNETIC RECORD MEMBERS

Filed Dec. 1, 1966 2 Sheets-Sheet 2

INVENTORS
RICHARD T. PETERS
ELIOT STONE
JOSEPH J. BOURDON

BY

THEIR ATTORNEYS

United States Patent Office 3,466,156
Patented Sept. 9, 1969

3,466,156
MAGNETIC RECORD MEMBERS
Richard T. Peters, Torrance, Eliot Stone, Los Angeles, and Joseph J. Bourdon, Inglewood, Calif., assignors to The National Cash Register Company, Dayton, Ohio, a corporation of Maryland
Filed Dec. 1, 1966, Ser. No. 598,292
Int. Cl. B23p 3/20
U.S. Cl. 29—195 12 Claims

ABSTRACT OF THE DISCLOSURE

A magnetically coated disc or other magnetic recording member is made with an overlayer of thin-film synthetic polymer onto which is adsorbed a uniformly smooth mineral wax lubricant. This provides a protected recording surface while allowing high recording density. The wax lubricant constitutes a surface having a low coefficient of friction for a flying record head having unintended continuous or momentary contact therewith.

The present invention is directed to magnetic record members and, more particularly, to improved magnetic record surfaces of record members for recording digital data.

In the process of recording and reproducing data on magnetic record surfaces of magnetic recording systems, the record surfaces are often subjected to excessive and undesirable abrasion and galling by direct contact of the recording surface with a magnetic record head assembly, including one or more record heads. Many recording systems employ flexible magnetic tapes or tape strips in which continuous direct contact is provided between the record head and record surface during operation while other systems employ discs or drums and provide for spacing of the record head from the record surface. Either of these arrangements presents problems in the provision of a suitable record member which is capable of enduring continuous direct contact of a record head, or unintended momentary contact of the spaced head and record surface. Further, it has been found that serious damage to the record surface, requiring replacement of the record member, occurs in many recording systems within a relatively short period of time after recording and reproducing operations commence.

At the present time, many magnetic recording systems have been developed and are in use which employ record members of the magnetic oxide type which includes an adhesive binder and abrasion resistant material wherein the composite recording medium has only intermediate recording density capability, i.e., less than 1500 bits per inch. In many instances, no protective overlayer is provided for the magnetic oxide type recording medium and direct contact is made with the magnetic recording heads during use. While the magnetic oxide record medium is durable because of abrasion resistant materials included therein, the degree of durability is often inadequate and frequent replacement of record members is required which necessitates frequent re-recording of data. In addition, a more serious problem is encountered by occasional galling of the magnetic oxide type medium which causes complete loss of recorded data in the damaged area of the record surface and, further, no new data can be recorded in the damaged area. Improvements in this magnetic oxide type of record member are disclosed in U.S. Patent No. 3,184,724 to E. H. Irasek in which an overlayer is provided consisting of a copolymer of vinyl acetate and vinyl chloride. While the overlayer described in this patent does provide improved resistance to wear, the copolymer does not provide a lubricant, as such, and does not provide many additional features and advantages of the present invention. Further, many presently operating recording systems using magnetic oxide type record surfaces are not considered satisfactory because of their limited capacity (density) for recording data in a predetermined recording surface area as well as limited resistance to abrasion and galling.

In accordance with the present invention, application of a thin-film of natural or synthetic waxes to certain types of surfaces has been found to substantially increase their resistance to abrasion and galling and also substantially increase their resistance to corrosion. However, the nature of the substrate for the wax is important in determining the effectiveness of the wax treatment, since firm adhesion between the thin-film of wax and its substrate is essential to retention of the thin-film for sustained resistance to abrasion, galling and corrosion. In particular, most highly polished metal surfaces offer poor adhesion to those wax thin-films which possess the low static and dynamic friction coefficients required to achieve a satisfactory measure of resistance to abrasion and galling. In accordance with the present invention, the required wax thin-film surface can be obtained even with highly polished metals by first applying a synthetic polymer thin-film to the latter and subsequently using this polymer thin-film surface as the substrate for the wax thin-film. In order to obtain the required resistance to abrasion, galling and corrosion, a synthetic polymer is chosen which adheres strongly to the original metal surface and to which the required wax thin-film will firmly adhere. A range of suitable synthetic polymers has been found which shows these characteristics when applied to the metal surface. From a wide range of natural and synthetic waxes which have been investigated, certain waxes have been found which possess a higher degree of the necessary compatibility with the polymer films to provide virtual bonding thereto and outstanding properties of resistance to abrasion and galling for protection of a wide variety of metal and plastic surfaces.

Thus, the present invention provides a vastly improved record surface including a protective overlayer comprising a novel combination of a synthetic polymer thin-film and a wax thin-film lubricant which avoids any need to rely on resistance to abrasion, galling or corrosion by the recording medium itself or the polymer overlayers, and has been found to be particularly desirable for record surfaces (e.g., cobalt) suitable for recording at high densities because of the thinness of the protective overlayer including the polymer thin-film and wax thin-film lubricant. Recording and reproducing at high densities, e.g., densities greater than 3000 flux reversals per inch, places the most stringent requirements on the ability of the recording surface to withstand momentary direct contact with a normally spaced record head for the reasons that the magnetic record medium comprises a thin-film of metal plated on the record substrate, and the record head must be more closely spaced to the record surface than for lower density recording in disc and drum systems. As a result, an unprotected thin-film metal record surface is not suited to high density recording because it is readily damaged on the first momentary direct contact with a closely spaced record head and also because it has very little resistance to corrosion.

In general, recording systems providing for spacing between the record surface and heads during recording/reproducing operations include either fixed heads or movable heads including "flying" heads. The "flying" heads provide an assembly for supporting the heads closely spaced above the recording surface during relative movement thereof by a film of air carried by and moving along with the record surface (laminar flow). An improved record head of this type is disclosed in commonly assigned copending U.S. application Ser. No. 585,674, filed Oct. 10, 1966, and U.S. application Ser. No. 564,912, filed July 8, 1966. These "flying" heads often are made of aluminum alloys and have a flat surface opposite the record surface for support on the film of air. The peripheral edge of this flat surface is not intended to make contact with the record surface and whenever direct contact does occur, any unprotected or inadequately protected recording medium (e.g., metal thin-film) is removed from the record member substrate. Often, a small vibration, a dust particle, or slight irregularity in the record surface will cause one or more of a group of "flying" heads to tilt and thereby deviate from their close-spaced relationship to the record surface causing an edge thereof to make direct contact with the record surface producing abrasion and galling. In turn, the abrasion and galling of the record surface destroys the surface smoothness, disturbing the laminar air flow necessary to provide the required surface to head spacing whereby more frequent or continuous direct contact of the record head and record surface is produced. Accordingly, many prior system arrangements have provided extremely hard metal overlayers for protection of the record medium, e.g., rhodium metal overlayers. This type of hard metal overlayer or other metal overlayers have not been effective in preventing serious damage in the form of abrasion and galling to the record medium and record heads within a relatively short time period of recording operation however; and the present invention is directed to an entirely different type of record surface protection to provide a record surface capable of being operated in these environments, for improved operation of recording systems.

Accordingly, an object of the present invention is to provide a record surface which overcomes the problems and disadvantages discussed supra and to provide an improved record surface for recording systems.

Another object is the provision of an improved record surface having an overlayer capable of providing adequate protection of the recording medium from record heads for recording and reproducing data on the record surface.

A further object of the present invention is to provide a record surface having a lubricated overlayer for protection of the recording medium from the record head.

Still another object is the provision of a record surface including a thin layer of metal providing for magnetically recording signals at high densities and a lubricated overlayer which is effective to prevent abrasion and galling of the record surface by the record heads and also to provide effective protection against corrosion.

Another object is to provide a record surface capable of withstanding repeated momentary or even sustained direct contact with record heads normally spaced therefrom and not intended to make direct contact during recording operations.

Other objects and features of the present invention will become apparent to those skilled in the art as the disclosure is made in the following detailed description of a preferred embodiment of the present invention as illustrated in the accompanying sheets of drawings in which.

Figure 1:
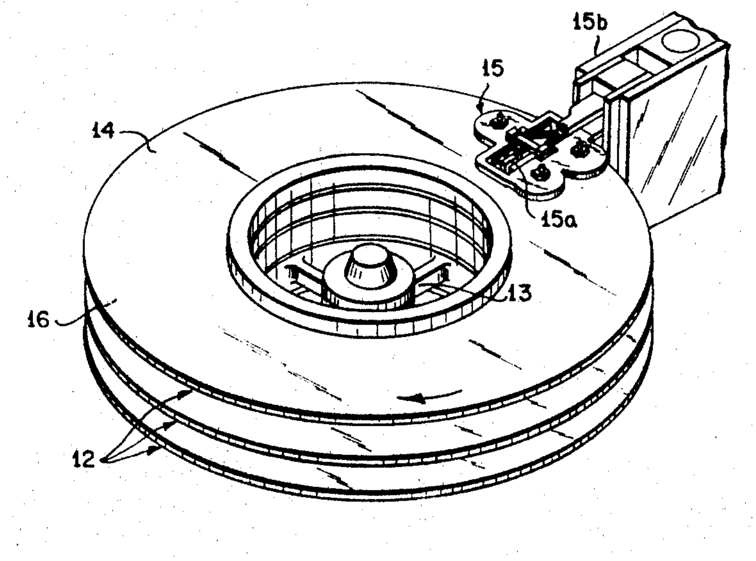
FIG. 1 is a perspective view of record discs and head assemblies for a magnetic recording system including record discs of the preferred embodiment of the present invention.

Referring now to the drawings, FIG. 1 shows record disc and head assemblies for a disc type recording system includ.ng a plurality of preferred magnetic record members of the present invention in a stack which is removably mounted as a unit on a rotatable spindle 13 of a disc-type recording system for a data processing system, for example. Each of the record members comprises a disc 12 having separate top and bottom record surfaces 14 and 16 which are moved past "flying" record heads **15*a* of the data storage apparatus for recording and reproducing data. Record heads 15*a* are mounted in an adjustable head assembly 15 which is disclosed and described in the previously mentioned copending applications, Ser. Nos. 585,674, and 564,912. A separate head assembly 15 is provided for the top and bottom record surfaces 14 and 16 of each of the record liscs 12 and the head assemblies are movably supported on a common support 15*b* which provides for radial and rotational movements of the head assembly 15 shown and the other head assemblies for the other surfaces of the record discs 12 indicated in FIG. 1. The radial movement provides for positioning the head assemblies over the desired group of data tracks and the rotational movement provides for clearing the head assemblies for removal and replacement of the stack. Because of the close spacing of the heads 15*a* and the record surfaces 14, an additional clearance movement is provided in conjunction with the rotational movement to clear the heads 15*a* from the record surface 14. Further, the discs 12 must be moving before lowering the head assembly 15 for cooperation with the record surfaces to provides the "air-film" spacing for the heads 15*a*. Accordingly, all continuous direct contact of the record heads 15*a* and record surfaces is avoided and only unavoidable random contact occurs as a result of minute irregularities of the record surface and the extremely close spacing of the heads 15*a* to the record surfaces 14 and 16. The record heads 15*a* are resiliently supported for vertical movement in the head assembly 15 in order to ride on a film of air to maintain the heads 15*a* spaced approximately 50 to 100 microinches, for example, away from the record surface 14 or disc 12 as are the other record heads in the five head assemblies (not visible) for the other discs 12**.

Referring now more particularly to the top record disc 12 shown in FIG. 1, surfaces 14 and 16 are formed on an aluminum alloy disc substrate 20 (FIG. 2) which is sufficiently thick (e.g., .125 inch) to provide and maintain uniform flatness of the disc 12 for recording on the recording surfaces 14 and 16 by the closely spaced "flying" record heads **15*a* in assembly 15; i.e., the substrate 20 has a circumferential flatness within 4 mils (.004 inch) total indicated runout (TIR) per quadrant and radial flatness of .6 mil (.0006 inch) per inch for operation with the "flying" heads 15*a*. A typical disc 12, as shown, is approximately fourteen inches in diameter and a suitable aluminum alloy for record disc 12 contains zinc 5.1–6.1%, magnesium 2.1–2.8%, copper 1.2–2.0% and chromium 0.18–0.4%. The surfaces of the disc substrate 20 are lapped to provide an extremely smooth or polished surface to eliminate all spikes or other sharp discontinuities to provide the desired uniform smoothness for operation with the closely spaced "flying" heads 15*a***.

Figure 2:
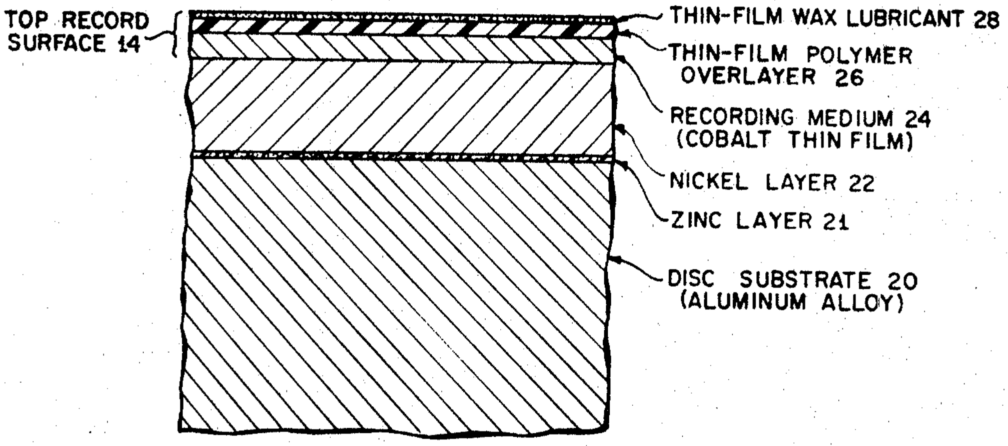
FIG. 2 is a greatly enlarged cross section of only the upper portion of one of the record discs shown in FIG. 1 showing the improved record surface including a composite thin-film protective overlayer including a thin-film wax lubricant.

In FIG. 2, the greatly enlarged cross section of a small portion of the top record surface 14 of the disc 12 shows typical relative thicknesses of the thin-films of record surfaces and the thicknesses are shown in proper proportion to clearly illustrate the features of the present invention. The bottom record surface 16 is identical in construction to the top surface 14 which includes a magnetic record medium 24 of cobolt plated on a non-magnetic nickel layer 22 that is formed on a zinc layer 21 on the substrate 20.

The top and bottom record surfaces 14 and 16 are formed on the surfaces of the record disc 12 following a thorough cleaning providing for vapor de-grease by a solvent for organic materials and removal of particulate material and elimination of surface electrostatic charge by a non-etching aluminium cleaning solution followed by a spray rinse of distilled or deionized water. The cleaning further includes immersion in a 1:1 (by volume) solution of nitric acid ($HNO_3$) at room temperature for 15 seconds (±5 seconds) followed by a spray rinse.

After the thorough cleaning, the disc substrate 20 and the surfaces thereof are prepared for the record surfaces 14 and 16 by providing a smooth layer of zinc (flashing) 21 by a first immersion in a zincate solution at room temperature (70° F.) for 30 seconds (±10 seconds) followed by a spray rinse and immersion in the solution of nitric acid and another spray rinse. The first zinc "flashing" is removed by the nitric acid to provide for extremely smooth zinc plated surfaces after a second immerson in the zincate solution which is followed only by a spray rinse. Having prepared the substrate 20 for the record surfaces 14 and 16, the disc 12 is immersed in a nickel solution for electroless deposit of the non-magnetic nickel layer 22 having a thickness of approximately 100 microinches. The nickel layer 22 provides a hard base providing for firm adherence of the next plating of the thin-film of cobalt recording medium 24.

The thin-film cobalt magnetic recording medium (600 A. to 6000 A.) is formed by electroless deposition over the layer of nickel by immersion of the nickel plated disc 12 in a soltuion containing cobalt chloride, sodium citrate, sodium hypophosphite, ammonium chloride, sodium lauryl sulfate, for 10 to 15 minutes at 80° C. to 85° C., followed by a spray rinse and forced air dry. Phosphorus is present with the cobalt in the thin-film so formed. The thickness of the thin-film of cobalt is important because a thin-film must be continuous to provide for continuous recording along data tracks formed thereon during recording operations. Also, to obtain uniformity in recordings and signal reproduction, the cobalt thin-film must be uniform not only to provide a more uniform spacing to the record heads but also to provide a minium thickness for magnetic flux densities capable of detection during reproduction to produce the desired signal amplitudes. The limitation on the maximum thickness of the cobalt is to obtain the desired resolution of the recording since the demagnetization increases with thickness of the magnetic thin-film. Accordingly, the maximum recording density (flux reversals per linear inch) decreases with increase of thickness. The range of thicknesses from 600 A. to 6000 A. (angstrom units) provides for satisfactory operation at high recording densities including those above approximately 3000 flux reversals per linear inch and up to 10,000 flux reversals per linear inch.

Protection of the cobalt record medium 24 is provided by the combination of the thin-film of synthetic polymer overlayer 26 and wax lubricant 28. Prior to application of overlayer 26 to the dry plated disc 12, including the cobalt recording medium 24, the individual surfaces of the disc are cleansed of surface contamination by rotating (in a horizontal plane) at a speed greater than 300 r.p.m. (revolutions per minute) and repeatedly spraying a solvent such as butanol thereon, and wiping with a lint-free cloth followed by a final spraying and continuing rotation of the disc until the solvent has evaporated. This cleansing operation is repeated until the cobalt surface of the disc 12 is determined to be free of surface contamination. The thin-film overlayer 26 is then applied to the cleansed surface of dry cobalt 24, for example, by spraying it with polymer solution while rotating the disc in the approximate speed range of 50 to 250 r.p.m. until it is completely covered by the solution. The spraying time and the rate of application can be varied to yield a synthetic polymer thin-film thickness anywhere within the required range of 600 A. to 6000 A. The rotation of the disc 12 is continued until the polymer coating (overlayer 26) is visibly dry. The other surface 16 of the disc 12 is coated by the synthetic polymer in the same manner. When the synthetic polymer used is a polyamide, the thin-film hardness and adherence to the substrate are improved by heating the coated disc 12 in an over for at least 2 hours and preferably as long as 16 to 24 hours at 140° to 170° C. The process of curing by heating varies with the particular synthetic polymer thin-film, but the preferred polyamide film has been found to benefit from the foregoing curing for reasons discussed hereinafter. Further, it has been found that the improvement in the adhesion of the thin-film polyamide overlayer 26 to the cobalt recording medium 24 (or other recording media) as a result of curing is such that the polyamide overlayer becomes virtually bonded to record medium 24. Thus, any possibility of "peeling" of the thin-film polyamide overlayer 26 is completely eliminated and it becomes an integral part of the record surfaces 14 and 16. A particular polyamide resin for this application, known as "Versamid 935," a trademarked product of General Mills, Incorporated, Kankakee, Ill., has been found to provide the aforementioned characteristics of adherence and strength when applied in equal parts by weight of amyl acetate, ethanol and butanol from a solution containing 4% resin. The polymer thin-film so formed provides desirable characteristics as a suitable substrate for firm adherence of ceresin wax thin-film 28 or certain other thin-films of wax lubricants having low friction coefficients discussed in detail infra. It should be noted that this polyamide resin is soluble in alcohol which distinguishes it from super-polyamide resins commonly known as nylon 6/6, 6, 6/10 or 11, for example.

Polyamide resin (Versamid 935) is derived from the reaction of dimerized linoleic acid with diamines or polyamines and has a softening point at 130° C. However, the characteristics of the polyamide film are changed by curing after application to the record medium 24 to the extent that it is no longer soluble in the original solvent mixture of ethanol, amyl acetate and butanol, indicating molecular cross linkage and increased molecular weight of super-polyamides. As a result, the overlayer 26 formed from this resin is significantly improved by curing to provide the desired properties of polyamide films having higher molecular weights, such as a high degree of toughness and resistance to abrasion and galling.

The last step, which is very important in the process of forming the record surface 14, is the provision of the thin-film lubricant 28 of ceresin wax. A dispersion of ceresin wax in a solvent containing 8% wax by weight, requires only very small amounts to be applied to the polyamide overlayer 26 to provide the desired thin-film of lubricant thereon. After application, the liquid, which contains extremely small suspended particles of ceresin, is allowed to dry to a cloudy white state and then buffed, preferably with a lint-free cloth or heavy-duty lint-free paper wiper tissues, to remove excess amounts of ceresin deposited thereon and this surface is then polished to a high gloss. The preferred ceresin wax is derived from a highly purified form of the mineral wax ozocerite, and melts in the range of 58–60° C. The preferred solvent in which the ceresin is dispersed is cyclohexane. When a clear solution of 8% of ceresin wax in cyclohexane is allowed to cool from 90° C. to room temperature (e.g., 35° C.), a fine dispersion results.

In view of the importance of the thin-film of ceresin wax in the performance of the record surfaces 14 and 16 of the disc 12 in recording operations, the procedure for obtaining a thin-film lubricant 28 having the desired characteristics of low coefficients of friction (both static and dynamic) while retaining high density recording capabilities of the recording systems is now described in detail. The ceresin wax first of all provides a lower static friction coefficient than dynamic friction coefficient. A frictionometer (provided with a standard stainless steel (No. 316), i.e., 18% nickel, 8% chromium and 74% steel, and a loading of less than ten pounds per square inch) showed the static friction coefficient on a number of polished ceresin treated surfaces to be .18 or less and dynamic friction coefficient of .25 or less. A wax lubricated record surface having approximately these static and dynamic friction coefficients produced the desired abrasion and galling resistant characteristics wherein the static friction coefficient provides the desired lower friction for a moving record surface or portion thereof coming into direct contact with a record head. For example, a 14-inch diameter rotating disc (1400 r.p.m.) coming into momentary direct contact with a "flying" head formed of an aluminum alloy in which the pressure or direct contact is less than ten pounds per square inch.

In order to prevent "flaking" of the thin-film lubricant 28 of ceresin wax upon direct contact with the record heads, and also allow closer spacing of the record head to the cobalt recording medium 24, the thickness of ceresin wax initially applied is reduced during buffing until the color of the record surface 12 is restored to the color prior to application of the ceresin wax. Accordingly, it has been found that a polyamide overlayer 26 on the cobalt (approximately 700 A.) providing a first order blue color (bright blue) followed by an application of ceresin wax buffed until this same blue color is restored will provide the desired thin-film having a uniform thickness, which may range from one to several molecules and to generally less than 1200 A. The thin-film of ceresin wax is applied to each of the upper and lower surfaces 14 and 16 in the same manner. Further, the preparation and application of thin-film ceresin wax to surfaces of magnetic drums (not shown), tapes (FIG. 5) or tape strips (FIG. 3) is accomplished in a similar manner to provide the desired uniform thin-film surface thereon. Thin-films of lubricant having thicknesses to 3600 A. have the desired properties but do require corresponding greater spacing of the record head and resulting decrease in maximum density of recording. Above 3600 A., it has been found that "flaking" of the thin-film of ceresin wax often occurs upon contact with the record head during recording (including both recording and reproducing operations).

Figure 3:
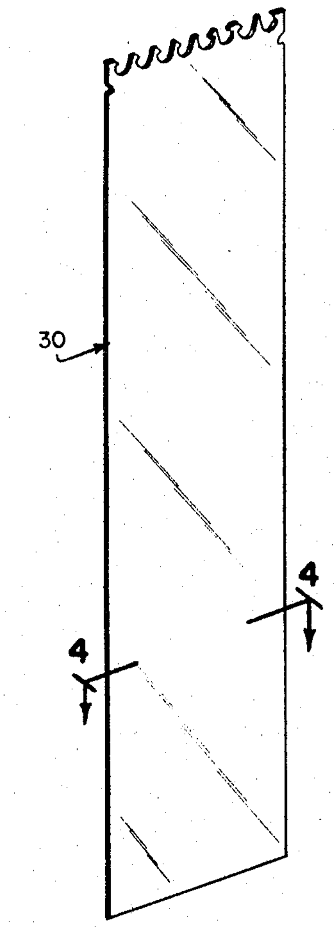
FIG. 3 is a perspective view of magnetic tape strip of the alternate embodiment of the present invention.

Referring now to FIG. 3, a record member comprising a flexible tape strip 30 is shown which is generally of the shape and form disclosed in the aforementioned U.S. Patent No. 3,184,724. As shown and disclosed in said patent, the record member is one of many suspended in a magazine and selectively released and directed onto a rotating capstan whereby it is transported past a record head for recording and reproducing operations.

Figure 4:
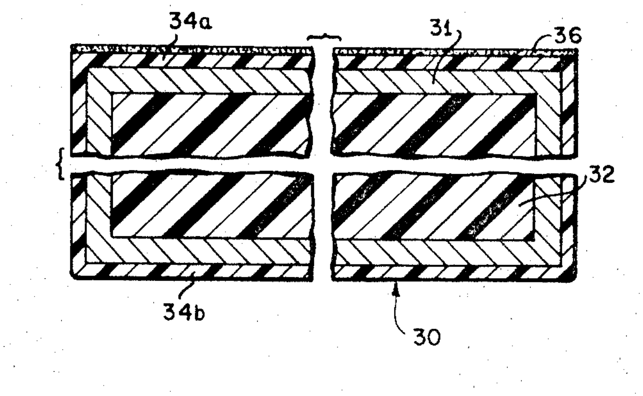
FIG. 4 is a cross sectional view of the magnetic tape strip shown in FIG. 3 to show the improved record surface thereof.

The tape strip 30 is both durable and flexible, being formed into a sheet or elongated substrate 32 (FIG. 4) by extrusion, for example, of polyester material such as polyethylene terephthalate sold under the trademark Mylar. The magnetic recording medium for tape strip 30 may comprise particles of magnetic material, such as the gamma form of ferric oxide embedded in an adhesive binder that in turn secures the particles to substrate 32 and covered by a polymer overlayer as shown and described in said patent. The present invention, as shown in FIGS. 3 and 4, provides for improved high density recording medium 31 comprising a thin-film of cobalt (with phosphorus), as in the preferred record disc embodiment of FIG. 1. The easily recognized difference between the embodiments of FIG. 1 and FIG. 3 is the flexibility of the tape strip substrate 32 (FIG. 4) and the rigid disc substrate 20. As shown in FIG. 4, the thin-film of cobalt 31 is applied directly to the flexible polyester substrate 32 (3 to 10 mils in thickness). An electroless process of applying the cobalt 31 is utilized, preferably by dipping in a cobalt solution after the substrate 32 has been sensitized for this plating. Sensitizing of substrate 32 is provided by treatment with stannous chloride followed by treatment with palladium chloride to the substrate 32 prior to electroless plating by cobalt. The plated cobalt on this substrate comprises a thin-film having a uniform thickness in the range of 2000 A. to 6000 A. for high density recording.

A protective surface for the cobalt plated tape strip 30 is applied by dipping it into the solution of polymer to provide a thin-film overlayer of polymer (600 to 6000 A. in thickness) which solution is described in detail in connection with the record disc 12. The protective surface is completed by applying a thin-film of ceresin wax 36 to one side only of tape strip 30 and over the polymer overlayer **34*a* as shown in FIG. 4, as described previously for record disc 12. The opposite side (overlayer 34*b*) should not be coated by lubricant in order to provide frictional engagement with a capstan of the storage apparatus disclosed in the aforementioned patent, for example. The lubricated overlayer 34*a*** provides the features of low static and dynamic coefficients of friction for engaging the record head on magnetic transducer means also disclosed in said patent, for example.

Figure 5:
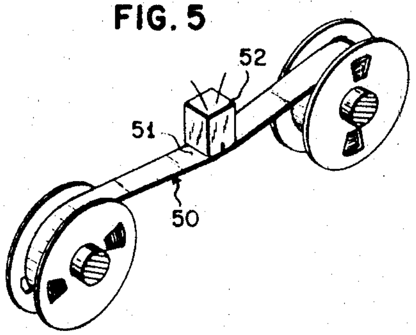
FIG. 5 is a schematic diagram of magnetic tape storage apparatus for illustrating another alternate embodiment of a magnetic tape provided with the protective overlayer of the present invention.

In FIG. 5, the magnetic tape storage apparatus illustrated schematically shows an elongated magnetic tape 50 which passes over a record head assembly 52 for recording and reproducing digital data along the length of the tape 50. The magnetic tape 50 has a record surface 51 which engages the record head assembly 52 and the protective surface of the present invention is provided for this record surface 51 only to provide the features and advantages disclosed herein. The record surface 51 of tape 50 includes, therefore, a magnetic layer recording medium of ferric oxide, for example, or a thin-film of metal (e.g., cobalt) to provide high density recording.

Referring again to the protective overlayer for the disc 12, magnetic tape strip 30 or magnetic tape 50, for a further discussion of suitable materials and desired properties thereof, various types of synthetic polymer films have been found suitable because they provide an overlayer for plated metals in the form of a thin-film that adheres firmly to the metal and also provides an adsorptive base for the thin-film of wax lubricant. This combination provides a protective overlayer or outer surface which is operative under normal conditions of low pressure contact with record heads (less than ten pounds per square inch) to provide protection of the cobalt recording medium and also provides and maintains an outer surface which is uniformly smooth for operation with record heads for disc or tape recording systems. Thus, the synthetic polymer thin-film and ceresin thin-film together not only provide protection against abrasion and galling of the cobalt thin-film record medium, but also provide for maintaining a smooth, low friction outersurface minimizing wear on the multiple record head assemblies which are usually the most expensive items of hardware in magnetic tape or tape strip recording systems. Accordingly, many attempts have been made to reduce wear of record head assemblies including treating the face or tape-engaging surface of the record head assembly or by the use of more durable metal heads; but it has been found lacking because of the prolonged and extensive amount of wearing engagement with the magnetic tape surfaces. In disc systems the protective overlayer maintains a smooth, uniform surface for improved uniform air-film for the "flying" heads which reduces the number of random contacts of the record heads and record surface in recording operations which, in turn, further increases the useful lifespan of the record disc. Also, and a very important feature of the protective overlayer of the present invention, is the superior protection of the thin-film of cobalt (and other thin-film magnetic metal recording mediums) over any other known protective overlayers including rhodium, polymer films or combinations thereof, for example.

As noted earlier, it is important to use synthetic polymer resins which are soluble in suitable solvents for forming a thin-film overlayer for the record surface. It is also important that the polymer thin-film overlayer be selected from a solvent soluble group which is easily cured at low temperatures (e.g., 70° C.) so as not to subject polymer substrates of magnetic tapes or tape strips to temperatures which would affect their dimensional stability during curing. The curing is required because of relatively low molecular weights of soluble polymer resins to increase the molecular weights and thereby increase the strength and durability of the thin-film overlayer. Polyamide resins in the group which includes "Versamid 935" are of importance in the present invention to provide suitable coatings for overlayers, have a molecular weight range from 5,000 to 10,000 and are produced by interaction between dibasic acids of the type $$HOOC—R—HOOC$$

and diamines or polyamines of the type $H_2N—R'—NH_2$ where R generally contains 34 carbon atoms and R' is generally of the polymethylene type $—(CH_2)_n—$ where $n$ is any one number between 2 and 6, inclusive.

The more uniform thin-film polymer overlayer for disc or tapes is provided by spraying or dipping and spinning where a sufficient amount of the polyamide solution is present to avoid streaking of the surface. Roll-coating is preferable for magnetic tapes (or strips prior to cutting from long lengths of tape) wherein the lower portion of a smooth metal roller is immersed in the polyamide solution and rotated to move in the opposite direction of tape movement at the area of engagement as the tape is drawn past the roller. Another smooth metal roller contacting the record tape after the application of polyamide by the first roller produces a more uniform, smooth coating.

In the provision of a protective overlayer for the record medium (e.g., cobalt) to resist mechanical action such as abrasion, galling and ordinary wear due to friction of record heads on magnetic tapes or tape strips, the more important considerations are the frictional coefficients of the lubricated surface of the overlayer and the adhesive or bonding characteristics of the overlayer to the record medium. All of the aforementioned resins are thermoplastic resins having a range of melting (softening points) from 90° C. to 278° C. While it is desirable to provide overlayers of higher melting points, strength, flexibility and elasticity in the particular applications for record discs or tapes, the formation of the polymer overlayer can be a problem because of insolubility which is associated with polyamide resins having these properties resulting from higher molecular weights, degree of linear symmetry, polarity of the unit and degree of molecular orientation. Other polymer overlayers providing advantages include the thermosetting types of polymer blends made by the reaction of epoxy resins with polyamides containing free amino groups, and those made by reaction of heat reactive phenolic resins wtih polyamides which contain reactive amino groups. These blends in a solvent mixture can be applied to record members to provide thin-film polymer overlayers in the aforementioned manners. The polyamide-epoxy blend offers the advantage of room temperature curing.

Synthetic polymer thin-film overlayers formed from a solution of resin or resin blends are applied to both surfaces of the disc 12. The thickness of the polymer overlayer is important and, more specifically and accurately, the thickness of a particular thin-film polymer overlayer should be uniform. The range of thicknesses of the polymer thin-films is from 600 A. to 6000 A.. Thicknesses below 600 A. provide only a minimum of protection and thicknesses above 6000 A. in combination with the thickness of the thin-film of lubricant increase the spacing between the record head and record medium (e.g., cobalt) so as to decrease the desired maximum recording density. Further, it has been found that thicknesses of the thin-film lubricant overlayer exceeding 3600 A. produce undesirable "flake-off" of the lubricant upon direct contact of the record surface and record heads, as noted earlier, which is particularly undesirable for disc and drum recording systems because the excess material increases random contact of the head and recording surface due to accumulation of fragments or particles of the lubricant on the record surface and record heads. In other recording systems providing continuous direct contact during operation (e.g., record tapes or strips) the fragments adhere to the record head or record surface causing nonuniformity of signals in recording and reproducing data.

Having considered some of the important aspects of the resin or resin blend type of overlayer, the very important feature of the provision of the lubricant of record surface is now considered in further detail. Because of the many critical factors involved in data recording systems, it should now be clear that the use of lubricants is desirable only if the overall thickness can be limited to provide the desired minimum record head to recording medium spacing and thereby maintain high recording densities. Further, the lubricant must not only be extremely thin (100 A. to 3600 A.), but also be uniformly adherent to the resin overlayer and should be of uniform thickness in order to maintain the overall uniform thickness of the record surfaces. In practice, a uniform thin-film of lubricant varying only from a mono-molecule to a few molecules in thickness has been found to be the most advantageous thickness since the adsorption into the synthetic polymer overlayer retains the lubricant and significant loss occurs only if the adsorbent outer surface of the polymer overlayer is removed.

In general, it has been found to be extremely difficult to provide a suitable lubricant, particularly where the lubricant is the outer surface of the record member, which engages the record heads. Under this condition, it is vital that the lubricant not build up or accumulate on the record heads or record surface during recording. This does not imply that it is not desirable to provide a uniform lubricated protective surface on the face of record heads for engaging tapes and tape strips or other recording systems. Retention of a lubricated record head face is difficult to provide for a suitable length of time when record surfaces engaging the record head face are not lubricated. The present invention provides a lubricant having the foregoing features and advantages and avoids the problems characteristic of lubricants by applying a thin-film only of ceresin wax to the record surface, which wax is in the mineral wax group.

The use of ceresin wax as a lubricant in combination with a polymer film for record surfaces has unexpected advantages considered important to its ability to withstand abrasion and galling upon direct contact with a "flying" record head in a disc type system shown in FIG. 1. This advantage is attributed to its low static coefficient of friction which can be described as a low "stick-slip," i.e., upon contact with the record surface there is a minimum of "stick" or static friction. Although the record surface is moving relative to the record heads 15*a* and random contact occurs during relative movement at speeds of 1400 r.p.m. (approximately) of the disc 12, the time duration of the contact can be only a fraction of a second and the duration of only the initial impact is even of a shorter time period. Under these conditions, effective protection against damage, abrasion or galling is determined to a great extent by the low static coefficient of friction and other factors determining the friction at the time of impact or initial contact. In other words, the tendency to "stick" or "slip" on initial contact or impact of the record head and record surface during relative movement thereof prior ot contact is important in determining the protection against abrasion and galling. Although this factor of low static coefficient of friction is considered to be very important, it would not normally have been considered prior to the present invention since this characteristic is not generally recognized as a characteristic of ceresin. The ceresin has a relatively low melting point, e.g., 58°–60° C., and the ability of the record surface of the present invention to withstand direct contact of the record head is considered to be a result, at least in part, of liquefaction of the ceresin thin-film on direct contact of the record surface and record head. Ceresin, as noted earlier, has other advantages in addition to its ability to avoid "sticking," or a low static coefficient of friction. Other waxes in the various groups, including natural and synthetic, were found to have many of the advantages of ceresin wax except for the low static friction coefficient of ceresin and lower static than dynamic friction coefficients. The natural waxes include animal, vegetable and mineral waxes. In addition to ceresin, other mineral waxes are montan and paraffin. The characteristics of paraffin as a lubricant in combination with the thin-film overlayer of polymer make it less desirable because it is softer and does not readily adhere to the polymer overlayer. As a result, the paraffin is not as durable as ceresin. Also, paraffin has a higher coefficient of friction, both static and dynamic. Thus, although paraffin wax could be used to provide a thin-film lubricant for the various record surfaces of the present invention, it would be much less desirable for the foregoing reasons. Another wax in the vegetable group, carnauba, has certain desirable features such as low coefficients of friction, but is less desirable than ceresin because it is difficult to apply in a smooth, thin-film on the polymer overlayer of the record surface. Further, although a carnauba wax thin-film (100 A. to 3600 A.) is harder than paraffin, for example, even the thinnest thin-films of carnauba wax tend to "flake-off" on impact or direct contact with the record heads. Of the remaining natural waxes, spermaceti, montan and beeswax are less desirable in the order given with beeswax the least desirable, because of softness, higher coefficients of friction, and other characteristics not found as desirable as ceresin. A more suitable wax lubricant than most of the natural waxes except ceresin is a synthetic wax, pentaerythritol tetrastearate. This synthetic wax is considered the best synthetic wax of many tested possessing to a high degree the desired characteristics for use in combination with the polymer overlayer to provide the protective overlayer of the record surface of the present invention.

It is important to note that the present invention provides for retention of a lubricant having particularly advantageous characteristics for protection of a highly polished metal surface required for magnetic recording at high densities. The requirements of uniform smoothness of this metal surface are such that surface irregularities do not exceed 20 microinches RMS (root mean square) and preferably a much more uniform smoothness of 4 microinches RMS. Accordingly, this type of bare metal surface has a very poor lubricant retention ability, and thin-film wax (e.g., ceresin) applied directly to the surface is not retained thereon to provide protection for the desired length of time for use in recording systems. On the other hand, lubrication of a record surface of magnetic oxide type recording mediums without a polymer overlayer presents difficulties in applying a sufficient amount of lubricant to provide a smooth lubricated surface because the lubricant tends to be completely absorbed by the magnetic oxide in its adhesive binder. Accordingly, a smooth lubricated surface is more difficult to obtain on bare metal or metal oxide surfaces than over a polymer thin-film overlayer which overlayer adsorbs only a small amount of the lubricant to provide a durable, continuous, uniform record surface having very low coefficients of friction. However, the lubricant is sufficient and durable and in addition to the other features provides the important feature of protection of the thin-film against corrosion to an extent not heretofore known.

In view of the foregoing, it should be apparent that the wax lubricated protective overlayer for record surfaces of the present invention is not limited to overlayers for plated cobalt or even to overlayers applied directly to the magnetic record medium. Rather, the wax lubricated protective overlayer of the present invention has broader application and use for providing the desired uniform smoothness and low static and dynamic coefficients of friction for protection of other magnetic record mediums including plated magnetic nickel, nickel-iron alloys including permalloy, and protection for non-magnetic metals such as rhodium, gold, aluminum alloys and others where, when desired, a non-magnetic film is provided over a plated magnetic record medium, for example. Also, the wax lubricated protective overlayer of the present invention is desirable to provide for protection for magnetic oxide record mediums of discs, drums, tapes or tape strips, as is evident from the foregoing description.

In the light of the above teachings, therefore, various modifications and variations of the present invention are contemplated and will be apparent to those skilled in the art without departing from the spirit and scope of the invention.

What is claimed is:

1. A magnetic record member for recording and reproducing digital data thereon comprising: a substrate for said record member; a magnetizable layer of uniform thickness on said substrate; and a smooth, continuous protective overlayer of uniform thickness for said magnetizable layer including the combination of a synthetic polymer thin-film firmly adherent to said magnetizable layer, and a highly polished thin-film of wax firmly adherent to said polymer thin-film, said polymer thin-film having substantially higher friction coefficients than said thin-film of wax and adsorption characteristics which provide for virtual bonding of said thin-film of wax to the surface of said polymer thin-film, and said highly polished thin-film of wax having low static and dynamic friction coefficients and a lower static friction coefficient than dynamic friction coefficient.

2. The magnetic record member according to claim 1, in which said highly polished thin-film of wax has a static coefficient of friction of less than 0.18 and a dynamic coefficient of friction of less than 0.25.

3. The magnetic record member according to claim 1, in which said substrate comprises a rigid disc member adaptable for rotation to provide relative movement for recording and reproducing data in a disc recording system.

4. The magnetic record member according to claim 1, in which said magnetizable layer comprises a magnetic thin-film.

5. The magnetic record member according to claim 4, in which said magnetic thin-film comprises cobalt having a uniform thickness in the order of from 600 to 6000 angstrom units.

6. The magnetic record member according to claim 1, in which said polymer thin-film comprises a thin-film of substantially uniform thickness in the order of from 600 to 6000 angstrom units.

7. The magnetic record member according to claim 1, in which said synthetic polymer film is formed from a polyamide resin soluble in alcohols and capable of being cured to increase the adherence of the polyamide film to said magnetizable layer.

8. The magnetic record member according to claim 1, in which said thin-film of wax comprises a thin-film of substantially uniform thickness in the order of from 100 to 3600 angstrom units.

9. The magnetic record member according to claim 4, in which the thickness of said thin-film of wax is on the order of 100 angstrom units.

10. The magnetic record member according to claim 1, in which said thin-film of wax consists of ceresin.

11. The magnetic record member of claim 1, in which said substrate comprises an elongated strip formed from a flexible sheet of biaxially oriented polyethylene terephthalate.

12. A rotatable magnetic record disc for cooperating with record heads supported at a distance of approximately 100 microinches from the surfaces of the record disc by a film of air; a disc formed from an aluminum alloy to provide a rigid substrate, the top and bottom surfaces of said disc having a uniform flatness for cooperation with said spaced record heads; a layer including an outer magnetic thin-film of cobalt over each surface of said disc substrate, said thin-film being of a substantially uniform thickness in the order of from 600 to 6000 angstrom units; a protective overlayer for said thin-film of cobalt, said protective overlayer comprising a thin-film of polymer firmly adherent to said cobalt, said polymer thin-film being of uniform thickness in the range of thicknesses from 600 to 6000 angstrom units and having an adsorbent surface; and a wax thin-film firmly adherent to said adsorbent surface of said polymer thin-film, said wax thin-film having a substantially uniform thickness in the range of thicknesses from 100 to 3600 angstrom units and an outer surface having a lower static friction coefficient than dynamic friction coefficient wherein said dynamic friction coefficient is less than 0.25.

References Cited

UNITED STATES PATENTS

| | | | |
|---|---|---|---|
| 2,923,642 | 2/1960 | Hausen | 117—68 |
| 3,180,715 | 4/1965 | Simon | 29—194 |
| 3,184,724 | 5/1965 | Irasek | 340—174.1 |
| 3,191,286 | 6/1965 | Armstrong et al. | 29—424 |
| 3,219,471 | 11/1965 | Chilton et al. | 117—47 |
| 3,258,319 | 6/1966 | Cox | 29—195 |
| 3,269,943 | 8/1966 | Armstrong et al. | 252—12 |

L. DEWAYNE RUTLEDGE, Primary Examiner

E. L. WEISE, Assistant Examiner

U.S. Cl. X.R.

29—197; 117—75; 340—174, 174.1